United States Patent Office 3,746,686
Patented July 17, 1973

3,746,686
PROCESS FOR CURING POLYEPOXIDES WITH POLYCARBOXYLIC ACID SALTS OF AN IMIDAZOLE COMPOUND AND COMPOSITIONS THEREOF
Clifford D. Marshall, Cherry Hill, N.J., Paul S. Byrd, Farmington, Mich., and Mark F. Dante, Moraga, Calif., assignors to Shell Oil Company, New York, N.Y.
No Drawing. Continuation-in-part of application Ser. No. 727,681, May 8, 1968. This application July 12, 1971, Ser. No. 161,991
Int. Cl. C08g 30/14
U.S. Cl. 260—47 EN
10 Claims

ABSTRACT OF THE DISCLOSURE

Curable epoxy resin compositions comprise (1) a polyepoxide and (2) a salt of (a) a polycarboxylic acid or anhydride and (b) an imidazole compound. A process for preparing resinified products from such compositions is also disclosed.

BACKGROUND OF THE INVENTION

This application is a continuation-in-part application of Ser. No. 727,681, filed May 8, 1968, now abandoned.

Related application Ser. No. 727,679, filed May 8, 1968, now U.S. 3,562,213, issued Feb. 9, 1971, is directed to room-temperature-stable compositions comprising (1) a polyepoxide, (2) a polycarboxylic acid anhydride curing agent and (3) an imidazole salt of a saturated aliphatic dicarboxylic hydroxy acid.

Polyepoxides, such as, for example, those obtained by reacting epichlorohydrin with polyhydric phenols in the presence of caustic, are promising materials for use in many industrial applications as they can be converted with curing agents to form insoluble, infusible products having good chemical resistance. Many conventional polyepoxide-curing agent systems, however, have certain drawbacks that greatly limit the industrial use of the polyepoxides. For example, the known mixtures comprising the polyepoxides and aliphatic amines set up rather rapidly. This is true even though the mixtures are stored in air-tight containers away from moisture and air. This characteristic necessitates mixing of the components just before use and rapid use of the material before cure sets in. Such a procedure places a considerable burden on the individual operators, and in many cases, gives inferior products because of (1) inefficient mixing, and (2) operations are conducted too rapidly.

Attempts have been made in the past to solve the above problems by the use of curing agents which are more difficult to react and would, thus, remain inactive in the polyepoxide composition at lower temperatures. While this action tends to lengthen the pot life or working time of the compositions, it also makes the compositions more difficult to cure. For example, it is known that the pot life can be extended by the use of aromatic amine curing agents. When aromatic amine curing agents are employed in curing polyepoxides, however, semi-thermoplastic or B-stage resins are rapidly formed during the early stages of cure, that is, before the molecules are all crosslinked. These resins are hard and brittle and consequently, little time is available in which to work with the resins before they set up. It would be desirable, therefore, to have a curing agent or catalyst which would give long pot life and at the same time would form a resin-catalyst system which remains pliable during the early stages of cure, i.e., B-stages very slowly, allowing greater working time in regard to handling of the resins. This is important in applications, such as molding compounds, laminates, castings, etc.

Many of these shortcomings were obviated by the use of liquid curing agents which comprise certain salts of certain heterocyclic compounds, i.e., salts prepared by reacting monocarboxylic acid with imidazole compounds, e.g., imidazole lactate. These imidazole salts of monocarboxylic acids and the process for their use in curing epoxy resins is disclosed in U.S. 3,356,645. While these curing agent salts derived from monocarboxylic acids and disclosed in U.S. 3,356,645 do give the polyepoxide compositions having a relatively long pot life and the resulting compositions remain pliable for a long period of time, they still do not have the extended latency (pot life) demanded for some applications and in most cases, these monocarboxylic acid salts are too hygroscopic. There is therefore a distinct need to provide epoxy curing agents which provide a longer pot life for epoxy compositions, yet cure to form hard, infusable resinified products.

SUMMARY OF THE INVENTION

The present invention provides polyepoxide compositions which are stable at room temperature for longer periods of time and exhibit significantly reduced hygroscopicity, yet are readily curable at elevated temperatures to give products exhibiting excellent physical and electrical properties. These compositions comprise a polyepoxide having, on the average, more than one vic-epoxy group per molecule and a curing amount of epoxy curing agent which is a salt prepared by reacting an imidazole compound with a polycarboxylic acid or anhydride.

It has now been discovered that polyepoxide compositions which have extended pot life and reduced hygroscopicity, yet cure rapidly at elevated temperatures are obtained by using as curing agents for the polyepoxides, salts of certain heterocyclic compounds which possess in the heterocyclic ring (1) a substituted C=N—C group and (2) a secondary amino group, i.e., an =N—H group or a tertiary amino group, i.e., an =N—R group wherein R is an organic radical and preferably a hydrocarbon radical and more preferably an alkyl radical, wherein the acid portion of the salt is derived from polycarboxylic acids or anhydrides.

Polyepoxide

The polyepoxides used in the present compositions comprise those materials possessing more than one vic-epoxy group, i.e., more than one

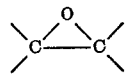

group, which group may be a terminal group, i.e.,

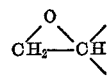

or may be in an internal position.

The polyepoxides may be saturated or unsaturated, aliphatic, cycloaliphatic, aromatic or heterocyclic and may be substituted with substituents, such as chlorine, hydroxyl group, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 1,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example:

di(2,3-epoxybutyl)adipate,
di(2,3-epoxybutyl)oxalate,
di(2,3-epoxyhexyl)succinate,
di(3,4-epoxybutyl)maleate,
di(2,3-epoxyoctyl)pimelate,
di(2,3-epoxybutyl)phthalate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxybutyl)-1,2,4-butanetricarboxylate,
di(5,6-epoxypentadecyl)tartrate,
di(4,5-epoxytetradecyl)maleate,
di(2,3-epoxybutyl)azelate,
di(3,4-epoxybutyl)citrate,
di(5,6-epoxyoctyl)cyclohexane-1,2-dicarboxylate,
di(4,5-epoxyoctadecyl)malonate.

Another group of the epoxy-containing materials includes those epoxidized esters of unsaturated alcohols and unsaturated carboxylic acids, such as 2,3-epoxybutyl-3,4-epoxypentanoate,
3,4-epoxyhexyl-3,4-epoxypentanoate,
3,4-epoxycyclohexyl-3,4-epoxycyclohexanoate,
3,4-epoxycyclohexyl-4,5-epoxyoctanoate,
2,3-epoxycyclohexylmethyl epoxycyclohexane carboxylate.

Still another group of the epoxy-containing materials includes epoxidized derivatives of polyethylenically unsaturated polycarboxylic acids, such as, for example:

dimethyl 8,9,12,13-diepoxyeicosanedioate,
dibutyl 7,8,11,12-diepoxyoctadecanedioate,
dioctyl 10,11-diethyl-8,9,12,13-diepoxy-eicosanedioate,
dihexyl 6,7,10,11-diepoxyhexadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyethylenically unsaturated hydrocarbons, such as epoxidized 2,2 - bis(2-cyclohexenyl)propane, epoxidized vinyl cyclohexene and epoxidized dimer of cyclopentadiene.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type.

Other examples include the polyglycidyl ether of 1,1,2,2-tetrakis(4-hydroxyphenyl) ethane (epoxy value of 0.45 eq./100 g. and melting point 85° C.), polyglycidyl ether of 1,1,5,5-tetrakis(hydroxyphenyl)pentane (epoxy value of 0.514 eq./100 g.), and the like mixtures thereof. Other examples include the glycidated novolacs as obtained by reacting epichlorohydrin with novon resins obtained by condensation of aldehyde with phenols.

Imidazole salts curing agents

The new curing agents which exhibit reduced hygroscopicity yet impart extended pot life to polyepoxide compositions comprise the polycarboxylic acid salts of the heterocyclic compounds possessing in the heterocyclic ring (1) a substituted C=N—C group and (2) a secondary amino group, i.e., a =N—H group, or a tertiary amino group, i.e., a =N—R' group wherein R' is an organic radical and preferably a hydrocarbon radical and more preferably an alkyl radical. Preferred examples of these heterocyclic compounds include, among others, the imidazoles, such as substituted imidazoles and benzimidazoles having the structural formulas:

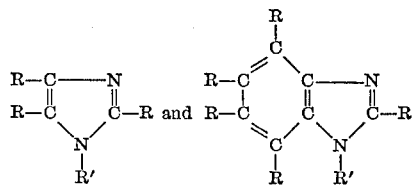

respectively, wherein R is selected from hydrogen atoms, halogen atoms, or an organic radical, such as a hydrocarbon radical or a substituted hydrocarbon radical, for example, the ester, ether, amide, imide, amino, halogen, or mercapto substituted hydrocarbon radicals, and R' is hydrogen or an organic radical, preferably a hydrocarbon radical and more preferably an alkyl radical. Especially preferred imidazole salts are those derived from the above imidazole compounds wherein the substituent is hydrogen or a hydrocarbon radical, and preferably an alkyl, alkenyl, cycloalkyl, cycloalkenyl, aryl, alkaryl or arylalkyl radicals, and particularly those containing no more than 15 carbon atoms and acids or anhydrides wherein the acid portion is derived from polycarboxylic acids or anhydrides containing from 2 to 20 carbon atoms.

Examples of suitable imidazole compounds include, among others, 2-methyl imidazole, 2-ethyl-4-methyl imidazole, 2,4-dioctyl imidazole, N-ethyl imidazole, N-butyl imidazole, N-butyl-2-ethyl imidazole, 2-cyclohexyl-4-methyl imidazole, 2-butoxy-4-allyl imidazole, 2-carboethoxybutyl-4-methyl imidazole, 2,4-dichlorobutyl imidazole, 2-octyl-4-hexyl imidazole, and 2-ethyl-4-phenyl imidazole, and mixtures thereof.

The acid portion of the salt is derived from a polycarboxylic acid or anhydride which contains from 2 to 20 carbon atoms. They may be aliphatic or aromatic, saturated or unsaturated.

Preferred aliphatic acids include the saturated and unsaturated aliphatic dicarboxylic acids containing up to 10 carbon atoms such as oxalic acid, malonic acid, succinic acid, glutaric acid, adipic acid, pimelic acid, suberic acid, azelaic acid, sebacic acid, diglycolic acid, hexahydrophthalic acid, maleic acid, fumaric acid and the corresponding anhydrides. Other aliphatic dicarboxylic acids include the saturated dicarboxylic acids containing up to 10 carbon atoms and up to 4 hydroxyl groups such as tartaric acid, malic acid, the chloromalic acids, the 2,4-dihydroxy glutaric acids, as well as mixtures thereof including the optically active forms and the optically inactive racemic mixture or meso forms.

Other suitable polycarboxylic compounds include the halogenated derivatives such as monochlorosuccinic acid, dichlorosuccinic acid, dichloromaleic anhydride and chlorendic anhydride.

Also included are the polybasic carboxylic acids containing more than two carboxylic groups such as citric acid.

Suitable aromatic polycarboxylic acids and anhydrides include the benzenedicarboxylic acids and anhydrides such as phthalic acid, phthalic anhydride, isophthalic acid, terephthalic acid, and pyrmomellitic dianhydride.

Still other suitable polycarboxylic compounds include tetrahydrophthalic anhydride and benzophenone tetracarboxylic dianhydrides and the like.

Particularly preferred curing agents because of the outstanding results obtained therefrom are monoimidazole adipate and diimidazole phthalate monohydrate.

The above-described imidazole salts can be prepared simply by reacting the particular imidazole, or benzimidazole with the polycarboxylic acid or anhydride to form the corresponding amine salt.

The instant salts are preferably prepared by mixing the desired polycarboxylic acid or anhydride with the particular imidazole compound and maintaining the temperature between about 20° and 100° C. Solvents such as the ketones like acetone, methyl ethyl ketone and methyl butyl ketone and alkanols containing up to about 5 carbon atoms such as methanol and ethanol may be employed, if desired, but are not necessary.

In general, the imidazole compound and the polycarboxylic acid or anhydride are employed in amounts so that at least one mole of imidazole compound is used per mole of carboxylic compound. The molar ratio of polycarboxylic acid to imidazole compound will vary usually from about 1:1 to about 1:2.5, although greater or lesser amounts may be employed. The reaction is preferably accomplished at temperatures between about 20° C. and 150° C. Since the reaction is exothermic, cooling means may be required to keep the temperature within the desired range.

The quantities in which the polyepoxides and the present curing agent salts are combined will vary over a wide range. It has been found, however, that the best cures are obtained when the polycarboxylic acid salts of the imidazole compounds are employed in amounts varying from about 0.1% to about 30% by weight of the polyepoxide with from about 1% to 15% by weight being preferred.

The instant heterocyclic curing agents may also be used in combination with other compounds such as polybasic anhydrides, for example, phthalic anhydride, hexahydrophthalic anhydride, tetrahydrophthalic anhydride, succinic anhydride, maleic anhydride, methyl-3,6-endomethylene-4-tetrahydrophthalic anhydride, chlorendic anhydride, pyromellitic dianhydride, benzophenone tetracarboxylic dianhydride, trimellitic anhydride, and the like, and the corresponding acids.

The above-noted additives are generally employed in amounts varying from 0.1 part to 25 parts per 100 parts of polyepoxide, and preferably from 1 part to 5 parts per 100 parts of polyepoxide.

The curing of the polyepoxides may be accomplished by mixing the polyepoxides with the polycarboxylic acid salt catalyst and heating the resulting composition at elevated temperatures, i.e., 150° C. The temperatures employed during the cure may vary over a wide range. In general, temperatures ranging from about 60° to 200° C. will give satisfactory results. Preferred temperatures range from about 100 to 175° C.

Various other ingredients and additives may be mixed with the polyepoxide composition including pigments, fillers, sand, rock, resin particles, graphite, asbestos, glass or metal oxide fibers, stabilizers, asphalts, tars, fungicides, insecticides, antioxidants, dyes, plasticizers, mold release agents, and the like.

The use of the instant salt curing agents at low levels of concentration impart long term room temperature stability to epoxy resins, e.g., molding materials, without affecting the cure cycle. Because of its stability, the resin-curing agent system B stages very slowly and remains pliable as it advances in cure allowing time for the material to be molded. The curing agents therefore, are very useful in formulating molding compositions and can be utilized in continuous, i.e., automatic, molding operations.

The compositions of this invention are also useful for preparing laminates. In preparing the laminate, the sheets of fibrous material are first treated with the mixture of polyepoxide and curing agent. This is conveniently accomplished by spreading the paste or solution containing the above-noted mixture onto the sheets of glass cloth, paper, textiles, etc. The sheets are then superimposed and the assembly cured under heat and pressure. The assembly is preferably cured in a heated press under a pressure of about 25 to 500 or more pounds per square inch and temperatures of about 150° C. The resulting laminate is extremely strong and resistant against heat and the action of organic and corrosive solvents.

The fibrous material used in the preparation of the laminates may be of any suitable materials such as glass cloth, chopped glass mats and continuous strand glass mats, paper, asbestos paper, mica flakes, cotton bats, duck muslin, canvas, synthetic fibers such as nylons, dacrons and the like. It is usually preferred to utilize woven glass cloth that has been given prior treatment with well known finishing or sizing agents therefor, such as chrome methacrylate or vinyl trichlorosilane.

The compositions of this invention are further useful in filament windings, both wet winding and prepreg winding, and in casting applications, such as encapsulation and/or embedment of electrical devices and preparation of cast foams containing microballoons.

To illustrate the manner in which the invention may be carried out, the following examples are given. It is understood, however, that the examples are for purposes of illustration and the invention is not to be regarded as limited to any of the specific materials or conditions therein. Polyepoxides referred to by letters are those described in U.S. 2,633,458. Unless otherwise indicated, parts are parts by weight.

All molding compositions in the examples had the following formulation in parts by weight: Polyepoxide plus imidazole salt, 28; silica, 70; carnauba wax, 2.

EXAMPLE I

This example illustrates the preparation of mono-imidazole adipate and its use as a curing agent for a polyepoxide, i.e., Polyepoxide X (a precondensate prepared by reacting 5.2 parts by weight of aniline, 6.1 parts by weight of m-aminophenol and 88.7 parts by weight of a glycidyl polyether of 2,2-bis(4-hydroxyphenyl)propane having an average molecular weight of about 380 and an epoxide equivalent weight of about 190).

Preparation.—The following components were charged into a reaction vessel:

| Component | Percent molar composition (excluding acetone) | Percent by weight |
|---|---|---|
| Adipic acid | 50.00 | 11.69 |
| Imidazole | 50.00 | 5.44 |
| Acetone | | 82.87 |

The adipic acid along with 71% by volume of the acetone was charged into a reaction vessel equipped with an agitator, reflux condenser, and a nozzle. The agitator was then started and the temperature brought to 135° F. At this time the imidazole which had been dissolved in the remaining 29% of the acetone was added to the reaction vessel and the system was allowed to react. After about a minute crystals began to form and a slight exotherm was observed. The system was allowed to react for 5 minutes. Cooling water was then applied and, when a temperature of 60° F. was attained, this temperature was maintained for thirty minutes. The reaction product was then filtered, washed with chilled acetone (30–50° F.), dried at 125° F. for 18 hours and particle size reduced so that 100% passed through a 200 mesh screen.

The resulting mono-imidazole adipate had the following properties:

Melting point _____ 103–105° C.
Amine value _____ 0.42 eg./100 g.
Fisher water _____ 0.24%.
Hygroscopicity _____ 14.5% water pick-up after 21 days.
Yield _____ 92–95%.

Hygroscopicity measurements were conducted at 100% relative humidity at 77° F. for 21 days with weighing being made every 2 days.

Use as a curing agent.—One hundred parts by weight of Polyepoxide X and 8.5 parts by weight of the previously prepared monoimidazole adipate were thoroughly mixed into a silica filled molding composition and evaluated. Other molding compositions were similarly prepared by mixing 100 parts by weight of Polyepoxide X with 4 parts by weight of monoimidazole adipate. The cured composition exhibited the following physical properties:

| Properties | Amount of curing agent, phr. | |
| --- | --- | --- |
| | 8.5 | 4.0 |
| Gel time at 150° C., seconds | 63 | 90 |
| Spiral flow,[1] inches | 22 | 33 |
| Heat deflection temperature, ° C | 103 | 113 |
| Flexural strength, p.s.i | 15,900 | 17,100 |
| Flexural modulus, p.s.i | 1.92×10⁶ | 1.83×10⁶ |

[1] Society of Plastics Industry, Epoxy Molding Materials Institute Method of Test for Spiral Flow, EMMI 1-66 (1,000 p.s.i.).

EXAMPLE II

This example illustrates the preparation of di-imidazole phthalate monohydrate.

The following compounds were charged in any order into a reaction vessel equipped with an agitator, reflux condenser, cooling system and nozzle:

| Component | Percent molar composition (excluding acetone) | Percent by weight |
| --- | --- | --- |
| O-phthalic anhydride | 19.05 | 14.76 |
| Imidazole | 38.10 | 13.57 |
| Acetone | | 67.63 |
| Distilled water[1] | 42.80 | 4.04 |

[1] Distilled water not added to initial reaction mixture.

When all the materials were dissolved and the temperature was 65–68° F., the addition of the distilled water was begun. The rate of addition for a 1.5 pound batch of amine salt was 2 ml./minute for a total addition period of approximately 40 minutes.

When the temperature had reached its peak exotherm (115° F.), and all the water had been added, the system was allowed to react 10 additional minutes. Cooling water was then applied until a temperature of 60° F. or cooler was achieved and maintained at this point for 30 minutes. The reaction product was filtered, washed with chilled acetone (30–50° F.), dried at 50° C. for 12–18 hours, particle size reduced (micro-pulverizer) so 100% passed through a 200 mesh screen. The resulting di-imidazole phthalate monohydrate had the following typical properties:

Melting point ____ 96–99° C. (Hoover-Capillary Tube).
Amine value ____ 0.62 eq./100 g.
Fisher water ____ 5.63% w. ($H_2O$ of crystallization).
Yield _____ 82–86%.

One hundred parts by weight of Polyepoxide X were thoroughly mixed with 6.5 parts by weight and with 4.5 parts by weight of the above di-imidazole phthalate monohydrate. These were then thoroughly admixed with silica filler. These molding compositions cured at 300° F. for 2 minutes exhibited the following physical properties:

| Properties | Amount of curing agent, phr. | |
| --- | --- | --- |
| | 6.5 | 4.5 |
| Gel time, sec | 56 | 75 |
| Spiral flow, inches | 22 | 30 |
| Heat deflection temperature, ° C | 114 | 117 |
| Flexural strength, p.s.i | 19,500 | 19,100 |
| Flexural modulus, p.s.i | 1.8×10⁶ | 1.8×10⁶ |

EXAMPLE III

Mono-2-methyl imidazole adipate was prepared by the procedure of Example I wherein an equal molar mixture of adipic acid and 2-methyl imidazole were reacted together in acetone solvent. The 2-methyl-imidazole adipate is a solid having a melting point of 86–87° C.

A molding composition comprising 100 parts by weight of Polyepoxide X and 5 parts by weight of mono-2-methyl imidazole adipate together with 265 parts by weight silica and 7.5 parts by weight release agent exhibited the following physical properties:

Gel time, sec. _____ 57
Spiral flow, inches _____ 24
Heat deflection temperature, ° C. _____ 123
Flexural strength, p.s.i. _____ 19,000
Flexural modulus, p.s.i. _____ 1.96×10⁶

EXAMPLE IV

This example illustrates the preparation of monoimidazole phthalate by reacting one mole of phthalic acid with one mole of imidazole. Sixty-eight grams (1 mole) of imidazole and 166 grams of o-phthalic acid (1 mole) were placed in 700 grams of ethanol at 100° F. and stirred until solution was complete. An equal volume of acetone was then added with stirring and the mixture cooled to room temperature. The precipitated salt was recovered by filtration and washed with cold acetone (40° F.) on the filter. The yield was 75% of theoretical. The resulting salt has a melting point of 144–146° C.

EXAMPLE V

This example illustrates the reduced hygroscopicity exhibited by the present polycarboxylic acid imidazole salts over the monocarboxylic acid salts of imidazole compounds.

The hygroscopicity of several imidazole salts were determined. The results are tabulated in Table I. It is clearly apparent that the imidazole salts of the polycarboxylic acids exhibit outstandingly better hygroscopicity and improved retention of heat distortion temperatures over the monocarboxylic acid salt, imidazole lactate.

Molding compositions were prepared from Polyepoxide X and these curing agent salts using the following formulation:

Component: Percent by weight
  Polyepoxide X plus imidazole salt _____ 28
  Silica _____ 70
  Carnauba wax _____ 2

The physical properties of the molding compositions are tabulated in Table I.

TABLE I

| Curing agent | M.P., °C. | Hygroscopicity, percent H₂O pickup after 21 days at 77° F./ 100% RH | Physical properties of cured molding composition | | | | |
|---|---|---|---|---|---|---|---|
| | | | Amount of curing agent, phr. | HDT, °C. | Flexural strength, p.s.i. | Flexural modulus, p.s.i. | Percent HDT retention after 6 mo.[1] | Percent flow retention after 6 mo.[1] |
| Imidazole lactate | 77–79 | 91.2 | 5.0 | 108 | 19,800 | 2×10⁶ | 82.5 | 35 |
| Di-imidazole phthalate monohydrate | 96–99 | 14.2 | 6.5 | 114 | 19,100 | 1.8×10⁶ | 92.6 | 33 |
| Imidazole phthalate | 144–146 | 23.0 | 9.0 | 110 | | | | |
| Monoimidazole adipate | 103–105 | 14.5 | 8.5 | 104 | 16,500 | 1.81×10⁶ | 90.9 | 60 |
| | | | 4.0 | 113 | 17,100 | 1.85×10⁶ | | 75 |

[1] Values are for freshly molded specimens of material stored 6 months at ambient temperature.

EXAMPLES VI TO XXVI

These examples illustrate the preparation of various imidazole salts and their use as curing agents for Polyether A (U.S. 2,633,458). Unless otherwise noted, all salts are mono-salts.

(VI) 2-methyl imidazole adipate
(VII) Imidazole adipate
(VIII) 2-methyl imidazole citrate
(IX) Imidazole citrate
(X) Imidazole succinate
(XI) 2-methyl imidazole succinate
(XII) 2-methyl imidazole malate
(XIII) Imidazole malate
(XIV) 2-methyl imidazole oxalate
(XV) Imidazole oxalate
(XVI) Imidazole tartrate
(XVII) 2-methyl imidazole tartrate
(XVIII) Imidazole tetrahydrophthalate
(XIX) 2-methyl imidazole tetrahydrophthalate
(XX) Imidazole hexahydrophthalate
(XXI) 2-methyl imidazole hexahydrophthalate
(XXII) 2-methyl imidazole phthalate
(XXIII) Benzimidazole adipate
(XXIV) Benzimidazole tartrate
(XXV) Benzimidazole phthalate
(XXVI) Benzimidazole oxalate Preparation.—Each of the above imidazole salts were formed by following the procedures of Example IV wherein 1 mole of the imidazole compound was reacted with 1 mol of the particular polycarboxylic acid.

Some of the physical properties of the resulting salts are tabulated in Table II.

TABLE II

| Salt | Form | M.P., °C | Hygroscopicity | Gel time, sec. | Change in viscosity after 7 days at room temperature [1] |
|---|---|---|---|---|---|
| 2-methyl imidazole adipate | Solid | 86–87 | 25.4 | 45 | 4 |
| Mono-imidazole adipate | do | 103–105 | 14.5 | 59 | 1 |
| 2-methyl imidazole citrate | Liquid | | | | |
| Imidazole citrate | do | | | | |
| 2-methyl imidazole diglycolate | Solid | 105–107 | 65.2 | 87 | 1 |
| Imidazole diglycolate | do | 100–103 | | 77 | 1 |
| 2-methyl malate | do | 90–93 | | 68 | 1 |
| Imidazole malate | do | 141–143 | 8.6 | 275 | |
| 2-methyl imidazole oxalate | do | 211–213 | 4.8 | 208 | 1 |
| Imidazole oxalate | do | 231–233 | 0.2 | 300 | 1 |
| 2-methyl imidazole tartrate | do | 196–197 | 0.3 | 300 | 1 |
| Imidazole tartrate | do | 204–206 | 4.1 | 300 | 1 |
| Imidazole succinate | do | 140–141 | | 117 | 1 |
| Imidazole isophthalate | do | 192–194 | | 105 | 1 |
| Imidazole malonate | do | 120–122 | | | |
| Imidazole fumarate | do | 168 | | | |
| Imidazole maleate | do | 130 | | | |
| Diimidazole phthalate monohydrate | do | 96–99 | 14.2 | 55 | |

[1] Viscosity increase, 0–5, wherein 0 indicates no perceptible increase and 5 indicates large increase in viscosity.

The gel times at 150° C. of some of the salts in Polyether A were also determined as well as the stability in Polyether A wherein various phr.'s of the particular salt was mixed with Polyether A and stored at room temperature for seven days.

The results of these tests are also tabulated in Table II.

Use as curing agents.—In each case, from 2 to 10 parts by weight of the above salts were thoroughly mixed with 100 parts by weight of Polyether A (U.S. 2,633,-458). The resulting compositions had excellent pot lives and when heated at 150° C. cured to form hard, insoluble, infusible products having improved chemical resistance, improved electrical properties and improved high temperature properties.

EXAMPLE XXVII

This example illustrates the improved stability of molding compositions containing imidazole salts of polycarboxylic acids as measured by spiral flow. Various amounts of several imidazole salts were mixed with Polyepoxide X and the retention of spiral flow measured after various times. The results are tabulated in Table III.

TABLE III

| Imidazole salts | Amount, phr. | Percent retention of spiral flow at 140° F. after X hours | | Percent retention of spiral flow after 30 minutes at 200° F. |
|---|---|---|---|---|
| | | 2 hrs. | 200° F. 24 hrs. | |
| Imidazole lactate | 5 | 23 | 0 | 0 |
| Imidazole adipate | 4 | 86 | 0 | 11 |
| Di-imidazole phthalate monohydrate | 4.5 | 53 | 0 | 0 |
| Imidazole oxalate | 7 | | 86 | |
| Imidazole malate | 9 | | 12 | 90 |
| Imidazole tartrate | 9.5 | | 70 | |
| 2-methyl imidazole tartrate | 10 | | 100 | 100+ |
| Imidazole succinate | 4 | | | 73 |

EXAMPLE XXVIII

Molding compositions were prepared from epoxidized cresol novolac (ECN 1299-Ciba) and two imidazole salts using the following formulation:

| Component: | Percent by weight |
|---|---|
| Resin plus imidazole salt | 28 |
| Silica | 70 |
| Carnauba wax | 2 |
| | 100 |

Epoxy cresol novolac (ECN 1299-Ciba) is a solid resin recommended for use in molding composition having a WPE (weight per epoxy) of 235; a molecular weight of 1290; an epoxy functionality of 5.4; and a softening point (Durrans') of 80° C.

The physical properties of the cured compositions are shown in the following table:

| | | | Physical properties | |
|---|---|---|---|---|
| Curing agent | Amount of curing agent, phr. | HDT, ° C. | Flexural strength, p.s.i. | Flexural modulus, p.s.i. ×10⁶ |
| Di-imidazole phthalate monohydrate | 3 | 121 | 11,800 | 2.08 |
| Mono-imidazole adipate | 4 | 217 | | |

EXAMPLE XXIX

High heat deflection temperatures are obtained from silica filled molding compositions comprising EPON® Resin 1031 alone or in admixture with Polyepoxide X cured with di-imidazole phthalate or mono-imidazole adipate. The following resin and curing agent compositions were made into molding formulations containing 68% w. silica and 2% w. Carnauba wax, and 30% w. resin blend plus curing agent, and gave the heat deflection temperatures shown below. EPON® Resin 1031 is described in Shell Chemical Company Product Specification SC:62-73 and is a mixture of isomers and homologues of polyglycidyl ethers of tetrakis(hydroxyphenyl) ethanes having an epoxide equivalent weight of 210 to 240.

| System No. | Composition of resin blend, percent w. | | Curing agent, phr. | | HDT, ° C. |
|---|---|---|---|---|---|
| | EPON® Resin 1031 | Polyepoxide X | Di-imidazole phthalate monohydrate | Mono-imidazole adipate | |
| 1 | 100 | 0 | 6 | | 225 |
| 2 | 75 | 25 | 5¼ | | 190 |
| 3 | 50 | 50 | 4½ | | 155 |
| 4 | 100 | 0 | | 8 | 225 |
| 5 | 75 | 25 | | 7 | 195 |
| 6 | 50 | 50 | | 6 | 162 |

We claim as our invention:

1. A room-temperature-stable, heat-curable composition having decreased hygroscopicity comprising (A) 100 parts by weight of a polyepoxide having more than one vicinal epoxy group in the molecule and (B) from about 0.1 to 30 parts by weight of a curing agent consisting of a salt of (1) an imidazole compound and (2) a polycarboxylic acid or polycarboxylic acid anhydride.

2. A composition as in claim 1 wherein the polyepoxide is a glycidyl polyether of a polyhydric phenol.

3. A composition as in claim 2 wherein the polyepoxide is a glycidyl polyether of 2,2-bis(4-hydroxyphenyl) propane.

4. A composition as in claim 1 wherein the imidazole compound has the structural formula:

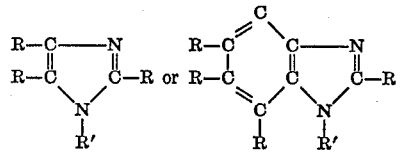

wherein R is hydrogen, halogen or an organic radical and R' is hydrogen or a hydrocarbon radical.

5. A composition as in claim 1 wherein the polycarboxylic compound is a saturated or unsaturated aliphatic dicarboxylic acid containing from 2 to 10 carbon atoms.

6. A composition as in claim 1 wherein the polycarboxylic compound is phthalic anhydride.

7. A composition as in claim 1 wherein the polycarboxylic compound is ortho-, meta- or para-phthalic acid.

8. A composition as in claim 1 wherein the polycarboxylic compound is tartaric acid.

9. A composition as in claim 1 wherein the salt is di-imidazole phthalate monohydrate.

10. A composition as in claim 1 wherein the salt is monoimidazole adipate.

References Cited
UNITED STATES PATENTS

| 3,329,652 | 7/1967 | Christie | 260—47 |
| 3,356,645 | 12/1967 | Warren | 260—47 |
| 3,438,937 | 4/1969 | Christie | 260—47 |
| 3,489,695 | 1/1970 | Green | 260—2 |
| 3,536,654 | 10/1970 | Lantz et al. | 260—33.6 |
| 3,538,039 | 11/1970 | Lantz et al. | 260—37 |
| 3,562,213 | 2/1971 | Collis et al. | 260—47 |

WILLIAM H. SHORT, Primary Examiner

E. A. NIELSEN, Assistant Examiner

U.S. Cl. X.R.

260—2 N, 18 EP, 53 EP, 75 EP, 78.3 R